May 30, 1972     W. W. LEE     3,666,359
CORRELATION PEAK DETECTOR IN OPTICAL SPATIAL FILTERING SYSTEM
Filed Aug. 26, 1970
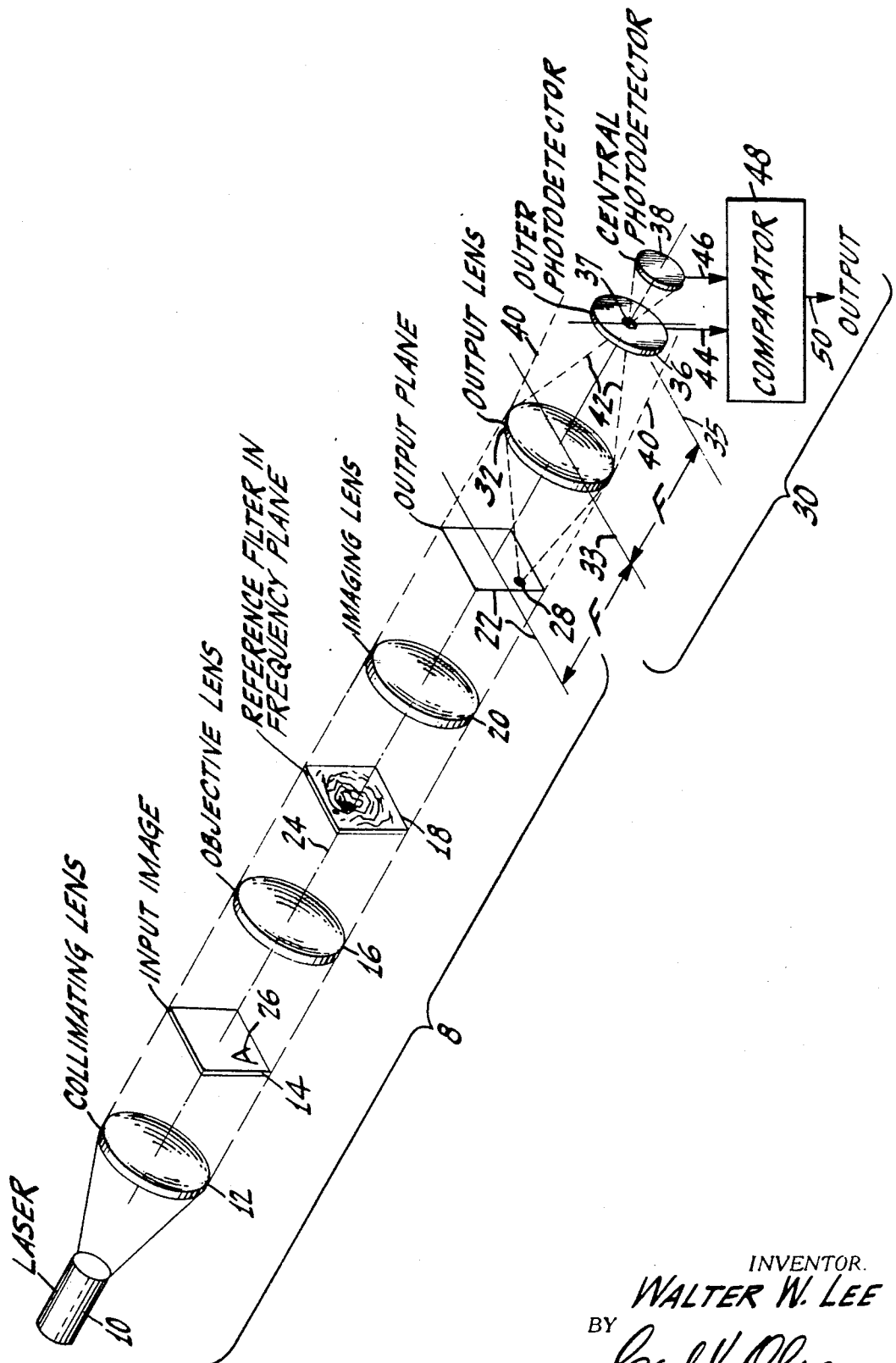
INVENTOR.
WALTER W. LEE
BY Carl V. Olson
Attorney ated May 30, 1972

United States Patent Office 3,666,359

3,666,359
CORRELATION PEAK DETECTOR IN OPTICAL SPATIAL FILTERING SYSTEM
Walter Wright Lee, Allendale, N.J., assignor to RCA Corporation
Filed Aug. 26, 1970, Ser. No. 66,966
Int. Cl. G06k 9/08; G01h 21/00; G01j 1/42
U.S. Cl. 356—71
1 Claim

ABSTRACT OF THE DISCLOSURE

A means is disclosed to detect a bright spot correlation peak at any position in an output plane of a double diffractometer optical correlator in which an input image is randomly located in an input plane. A lens is positioned a distance equal to its focal length F from the output plane. A central photodetector and a concentric outer photodetector are positioned at the distance F from the lens. The photodetectors are constructed so that the outer photodetector produces a larger electrical output signal when both photodetectors are uniformly illuminated. A bright spot correlation peak at any location in the output plane uniformly illuminates both of the concentric photodetectors, and a general or diffuse illumination in the output plane illuminates solely the central photodetector. A comparator receptive to electrical signals from the photodetectors provides a "match" output when the signal from the outer photodetector is larger than the signal from the central photodetector.

BACKGROUND OF THE INVENTION

The invention relates to automatic character, or pattern, or image recognition systems using optical cross-correlation techniques to accomplish a rapid comparison of an unknown image with a representation of a known reference image. In such systems, it is desirable to be able to detect a match even though the unknown image is located in any off-axis position in the input plane, or is angularly displaced relative to the reference representation, or is of a different size than the reference representation.

One pattern recognition device, described in the paper "Signal Detection by Complex Spatial Filtering," by A. Vander Lugt, IEEE Transactions on Information Theroy, vol. IT-10, page 139, April 1964, includes a hologram recording of a Fourier transformed image of the pattern to be recognized. Generally speaking, a hologram is a recording of both the amplitude and phase of a light wavefront. A particularly suitable way of making a hologram is through the interference of coherent light from an object with an off-axis reference beam. A Fourier transform hologram is a recording of the amplitude and phase of the Fourier transform of an object; it can be made by locating a recording medium at the back focal plane of a lens with the object at the back focal plane of a lens with the object at the front focal plane.

In the Vander Lugt apparatus, a phototransparency to be examined is illuminated by coherent light which is projected through the phototransparency, a spherical converging lens, and the reference hologram. The phototransparency and the hologram are each separated from the lens by a distance equal to the lens focal length so that a Fourier transformed image of the phototransparency is projected onto the hologram. If the phototransparency contains the pattern to be recognized, and if that pattern is of a predetermined size and angular orientation, three fairly intense light spots will be projected from the reference hologram through a second lens onto an output plane. The reference hologram and the output plane are each separated from the second lens by the lens focal length. Two of the projected spots are ignored or masked out while the third has an amplitude distribution which is a cross-correlation of the pattern to be recognized and the pattern of the reference hologram and thus is representative of the location on the phototransparency of the recognized pattern. If the pattern is not included in the phototransparency, the light intensity projected through the hologram remains below some threshold level. For example, if the letter A is initially recorded on the reference hologram, a bright spot will be projected from the hologram if the transparency contains the pattern A of a specific size, regardless of its displacement on the photographic transparency. From the location of the spot, one can determine the location of the A on the phototransparency.

The capacity of the Vander Lugt apparatus to recognize a pattern independently of its location results from the fact that both the hologram recording of the pattern and the projected pattern from the transparency are Fourier transforms. However, if the pattern included on the transparency is larger or small than a specified size, or if it is oriented at some arbitrary angular position, it will not be recognized. Hense, the Vander Lugt apparatus is displacement insensitive, but it is sensitive to the magnification and orientation of the pattern to be recognized.

Proposals have been made to detect patterns which are larger or smaller than a specified size by magnifying and demagnifying the input pattern so that a match can be detected. Similarly, the input pattern can be rotated so that a match can be detected.

While the Vander Lugt apparatus is position insensitive in that it produces a bright spot in the output plane regardless of the position of the input pattern in the input plane, the bright spot is located in the output plane at a location determined by the position of the pattern in the input plane. It is then necessary to automatically detect the fact that a bright spot is present somewhere in the output plane, and to supply a signal to associated data processing equipment. This function has been accomplished by using a mosaic of photodetectors in the output plane, or by using a photodetector which scans the output plane. Apparatus of these types are complex and slow-acting, and it is accordingly a general object of this invention to provide a very simple and quick-responding means for detecting the presence of a bright spot correlation peak at any location in the output plane of an optical correlator.

SUMMARY OF THE INVENTION

Means are provided to distinguish between concentrated light and diffuse light in the output plane of an optical system. A lens is positioned so that a bright spot of light at any location in the output plane uniformly illuminates both a central photodetector and a concentric outer photodetector, and a general illumination in the output plane illuminates solely the central photodetector. An electrical signal comparator provides an output when the signal from the outer photodetector exceeds a predetermined relationship with the signal from the central photodetector.

BRIEF DESCRIPTION OF THE DRAWING

The sole figure of the drawing is a perspective diagrammatic view of a double diffractometer optical correlator provided with means to automatically detect a correlation peak in the output plane thereof.

DESCRIPTION OF THE PREFERRED EMBODIMENT

Referring in greater detail to the drawing, a double diffractometer optical correlator 8 is shown in which a laser 10 produces a beam of coherent light which is directed to a collimating lens 12 from which collimated light is directed, in the order named, through an input image transparency 14, an objective lens 16, a reference hologram filter 18, and an imaging lens 20 to an output plane 22, all arranged along an optical axis 24. The output plane 22 is a geometric plane which is normally not occupied by any physical device, but which may be occupied by a ground glass for the purpose of making the light in the plane visible. The optical correlator 8 is as shown and described by A. Vander Lugt et al. in chapter 7, "Character-Reading By Optical Spatial Filtering," pp. 125-141 of the book "Optical and Electro-Optical Information Processing," edited by J. T. Tippett et al. and published in 1965 by the MIT Press.

The reference filter 18 in the frequency plane is a hologram constructed as described in the aforementioned publication for use in detecting a given character, pattern or image located in the input image plane 14. For example, the filter 18 may be constructed to recognize the character A. If the input image transparency 14 contains the same character 26, a bright spot correlation peak 28 will be produced in the output plane 22. The input character 26 may be located anywhere in the input plane 14, and the correlation peak 28 will be produced at a corresponding location in the output plane.

The system is position insensitive in that the input character may be located anywhere in the input plane, but the input character must have a predetermined angular position and size determined by the reference filter 18. If the angular orientation of the input character is unknown, the input image transparency 14, or the reference filter 18, may be rotated through 360 degrees while the output plane 22 is examined for a correlation peak. Similarly the magnification and demagnification of the input image may be varied while the output plane is examined for a correlation peak. In the absence of a correlation between the input image 14 and the reference filter 18, the light in the output plane is general and random, without any significantly bright spots.

A correlation peak detector 30 is provided for rapidly and automatically detecting one or more bright spot correlation peaks 28 occurring at any location in the output plane 22. An output lens 32 is located in a plane 33 along the optical axis 24 of the correlator 8 at a distance equal to the focal length F of the lens from the output plane 22. A detection plane 35 is created along the optical axis 24 at a distance equal to the focal length F of the lens from the lens.

An outer photodetector 36 having a central aperture 37 is shown located in the detection plane 35, and a concentric central photodetector 38 is shown positioned to receive light passing through the axial center of the detection plane 35. The outer photodetector 36 has a photosensitive area which is much larger than the area of its coaxial aperture 37. The size of the aperture 37 determines the amount of light reaching the central photodetector 38 and may typically be one-tenth the lens aperture f number, or about 0.4 mm. The outer diameter of the outer photodetector 36 may be about two-thirds the diameter of the lens 32. Various physical arrangements of the outer photodetector 36 and the central photodetector 38 are possible. For example, the central photodetector 38 can be made much smaller and located within the aperture in the outer photodetector 36 or on the other side of the outer photodetector 36. The important considerations are that the central photodetector 38 be responsive solely to light passing through the detection plane 35 near the optical axis 24, and that the outer photodetector 36 be responsive to substantially all the light reaching the detection plane 35 except the light near the optical axis.

The operation of the correlation peak detector 30 will now be described. In the illustrated condition, a bright spot correlation peak 28 is produced in the output plane 22 because an input character 26 in input plane 14 matches the reference filter in frequency plane 18. Light in the bright spot correlation peak 28 is collected by output lens 32 and directed along parallel paths within the bounds represented by dashed lines 40. This uniformly illuminates the outer photodetector 36 and a portion of the central photodetector 37 determined by the aperture 37 in outer photodetector 36. If there are another one or more additional bright spot correlation peaks in the output plane 22 due to the presence in the input plane 14 of an additional character or characters which match the reference filter 18, the light from the additional correlation peak or peaks is similarly translated by output lens 32 to a general illumination of the outer photodetector 36. Therefore, the outer photodetector 36 is receptive to substantially all of the light energy of bright spot correlation peaks present in the output plane 22.

On the other hand, when there is no character in the input plane 14 that matches the reference filter 18, there is no bright spot correlation peak in the output plane 22, but rather the output plane contains a generally diffuse and randomly irregular illumination not including any areas that are particularly brighter than other areas. In this case, light from the output plane 22 which is collected by output lens 32 is concentrated along dotted lines 42 to the axial center of the detection plane 35. This concentrated light passes through the aperture 37 in the outer photodetector 36 and impinges on the central photodetector 38. The central photodetector 38 is thus receptive to solely the light energy at the center of the detection plane 35.

The described behavior of light between the output plane 22 and the detection plane 35 is in accordance with actual observations, and is due to the fact that the system employs coherent light from laser 10. Therefore the light behaves in accordance with the principles of diffraction optics, rather than simple geometrical optics.

To summarize, the outer photodetector 36 has a small aperture and is receptive to substantially all of the evenly-distributed light energy in the output plane 22. It therefore produces an electric output signal on lead 44 which is a maximum when there are one or more bright spot correlation peaks in the output plane 22 as a result of a match or matches between the input image plane 14 and the reference filter 18. On the other hand, the central photodetector 38 is receptive to light energy at the center of the detection plane 35 and produces a maximum output signal on lead 46 when the input image 14 does not match the reference filter 18.

The electric signals applied over leads 44 and 46 to the comparator 48 are compared in the comparator and produce a "match" output signal on output lead 50 when the signal from the output photodetector 36 exceeds some predetermined relationship with the signal from the central photodetector 38. The output of the comparator is then used by associated data processing equipment (not shown).

What is claimed is:

1. In an optical correlator having, along an optical axis, a coherent light source, a randomly positioned input image, a reference hologram and an output plane in which the Fourier transform of the product of the input image function and the reference hologram appears, means to detect a bright spot correlation peak at any position in said output plane, comprising
    an output lens positioned a distance equal to its focal length F from said output plane,
    a central photodetector and a concentric outer photodetector effectively positioned along said optical axis at a distance F from said lens, said photodetectors being constructed so that the outer photodetector produces a larger electrical output signal when both photodetectors are uniformly illuminated,
    whereby a bright spot correlation peak at any location in said output plane uniformly illuminates both of said concentric photodetectors, and a general illumination in said output plane illuminates solely said central photodetector, and
    a comparator receptive to electrical signals from said photodetector to provide a "match" output when the signal from the outer photodetector is larger than the signal from the central photodetector.

References Cited

UNITED STATES PATENTS

| | | | |
|---|---|---|---|
| 3,496,367 | 2/1970 | Eckermann | 250—203 |
| 2,963,938 | 12/1960 | Irland et al. | 356—104 |
| 3,310,680 | 3/1967 | Hasegawa | 250—216 X |
| 3,571,603 | 3/1971 | Bryant et al. | 350—3.5 UX |
| 3,027,461 | 3/1962 | Kavanagh | 356—104 |
| 3,450,016 | 6/1969 | Yamada | 356—222 X |
| 3,428,403 | 2/1969 | Konishi | 356—222 |
| 3,409,378 | 11/1968 | Shimomura | 356—222 |

RONALD L. WIBERT, Primary Examiner

W. A. SKLAR, Assistant Examiner

U.S. Cl. X.R.

250—203, 216; 340—146.3 P, 146.3 Q; 350—3.5; 356—104, 222